(12) United States Patent
Lee et al.

(10) Patent No.: US 12,387,521 B2
(45) Date of Patent: Aug. 12, 2025

(54) METHODS AND APPARATUS TO MONITOR ENVIRONMENTS

(71) Applicant: The Nielsen Company (US), LLC, New York, NY (US)

(72) Inventors: Morris Lee, Palm Harbor, FL (US); Alejandro Terrazas, Santa Cruz, CA (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/605,246

(22) Filed: Mar. 14, 2024

(65) Prior Publication Data

US 2024/0221417 A1    Jul. 4, 2024

Related U.S. Application Data

(60) Continuation of application No. 16/901,870, filed on Jun. 15, 2020, now Pat. No. 11,978,275, which is a continuation of application No. 16/057,302, filed on Aug. 7, 2018, now Pat. No. 10,685,221, which is a continuation of application No. 15/355,596, filed on Nov. 18, 2016, now Pat. No. 10,049,265, which is a
(Continued)

(51) Int. Cl.
| | | |
|---|---|---|
| *G06V 20/52* | (2022.01) | |
| *G01B 11/25* | (2006.01) | |
| *G06F 3/03* | (2006.01) | |
| *G06T 7/593* | (2017.01) | |
| *G06V 10/145* | (2022.01) | |
| *G06V 40/10* | (2022.01) | |
| *H04H 60/66* | (2008.01) | |
| *H04N 13/261* | (2018.01) | |
| *H04N 21/442* | (2011.01) | |

(52) U.S. Cl.
CPC .......... *G06V 40/10* (2022.01); *G01B 11/254* (2013.01); *G06F 3/0304* (2013.01); *G06T 7/593* (2017.01); *G06V 10/145* (2022.01); *G06V 20/52* (2022.01); *H04H 60/66* (2013.01); *H04N 13/261* (2018.05); *H04N 21/44218* (2013.01)

(58) Field of Classification Search
CPC ..... G01B 11/254; G06F 3/0304; G06T 7/593; G06V 10/145; G06V 20/52; G06V 40/10; H04H 60/66; H04N 13/261; H04N 21/44218
See application file for complete search history.

(56) References Cited

U.S. PATENT DOCUMENTS 7,623,674 B2 * 11/2009 Nichani .................... G06T 7/20
                                                                    348/47
2004/0046736 A1 *  3/2004 Pryor ...................... G16H 50/50
                                                                    345/156
(Continued)

*Primary Examiner* — Tsung Yin Tsai

(57) ABSTRACT

Methods and apparatus to monitor environments are disclosed. Example audience measurement devices disclosed herein execute, in connection with a first frame of data, a three-dimensional recognition analysis on an object detected in an environment within a threshold distance from a sensor. Disclosed example audience measurement devices also detect that the object has moved outside the threshold distance from the sensor in a second frame subsequent to the first frame. Disclosed example audience measurement devices further execute a two-dimensional recognition analysis on the object in the second frame.

20 Claims, 8 Drawing Sheets

Related U.S. Application Data continuation of application No. 14/669,798, filed on Mar. 26, 2015, now Pat. No. 9,529,451, which is a division of application No. 13/708,698, filed on Dec. 7, 2012, now Pat. No. 9,020,189.

(56) References Cited

U.S. PATENT DOCUMENTS

| | | | |
|---|---|---|---|
| 2005/0093697 A1* | 5/2005 | Nichani | G07C 9/00 |
| | | | 340/545.1 |
| 2005/0249382 A1* | 11/2005 | Schwab | G06T 7/593 |
| | | | 340/541 |
| 2011/0222757 A1* | 9/2011 | Yeatman, Jr. | H04N 13/246 |
| | | | 382/154 |
| 2012/0287233 A1* | 11/2012 | Wang | H04N 13/128 |
| | | | 348/42 |
| 2017/0180652 A1* | 6/2017 | Baca | H04N 13/161 |

* cited by examiner

METHODS AND APPARATUS TO MONITOR ENVIRONMENTS

CROSS-REFERENCE TO RELATED APPLICATIONS

This disclosure arises from a continuation of U.S. patent application Ser. No. 16/901,870, filed on Jun. 15, 2020, now U.S. Pat. No. 11,978,275, which is a continuation of U.S. patent application Ser. No. 16/057,302, filed on Aug. 7, 2018, now U.S. Pat. No. 10,685,221, which is a continuation of U.S. patent application Ser. No. 15/355,596, filed on Nov. 18, 2016, now U.S. Pat. No. 10,049,265, which is a continuation of U.S. patent application Ser. No. 14/669,798, filed Mar. 26, 2015, now U.S. Pat. No. 9,529,451, which is a divisional of U.S. patent application Ser. No. 13/708,698, filed Dec. 17, 2012, now U.S. Pat. No. 9,020,189. Priority to U.S. patent application Ser. No. 16/901,870, U.S. patent application Ser. No. 16/057,302, U.S. patent application Ser. No. 15/355,596, U.S. patent application Ser. No. 14/669,798 and U.S. patent application Ser. No. 13/708,698 is claimed. U.S. patent application Ser. No. 16/901,870, U.S. patent application Ser. No. 16/057,302, U.S. patent application Ser. No. 15/355,596, U.S. patent application Ser. No. 14/669,798 and U.S. patent application Ser. No. 13/708,698 are hereby incorporated herein by reference in their respective entireties.

FIELD OF THE DISCLOSURE

This disclosure relates generally to audience measurement and, more particularly, to methods and apparatus to monitor environments.

BACKGROUND

Audience measurement of media (e.g., broadcast television and/or radio, stored audio and/or video content played back from a memory such as a digital video recorder or a digital video disc, a webpage, audio and/or video media presented (e.g., streamed) via the Internet, a video game, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to specific piece(s) of media.

In some audience measurement systems, the people data is collected by capturing a series of images of a media exposure environment (e.g., a television room, a family room, a living room, a bar, a restaurant, etc.) and analyzing the images to determine, for example, an identity of one or more persons present in the media exposure environment, an amount of people present in the media exposure environment during one or more times and/or periods of time, etc. The collected people data can be correlated with media detected as being presented in the media exposure environment to provide exposure data (e.g., ratings data) for that media.

DETAILED DESCRIPTION

Figure 1:
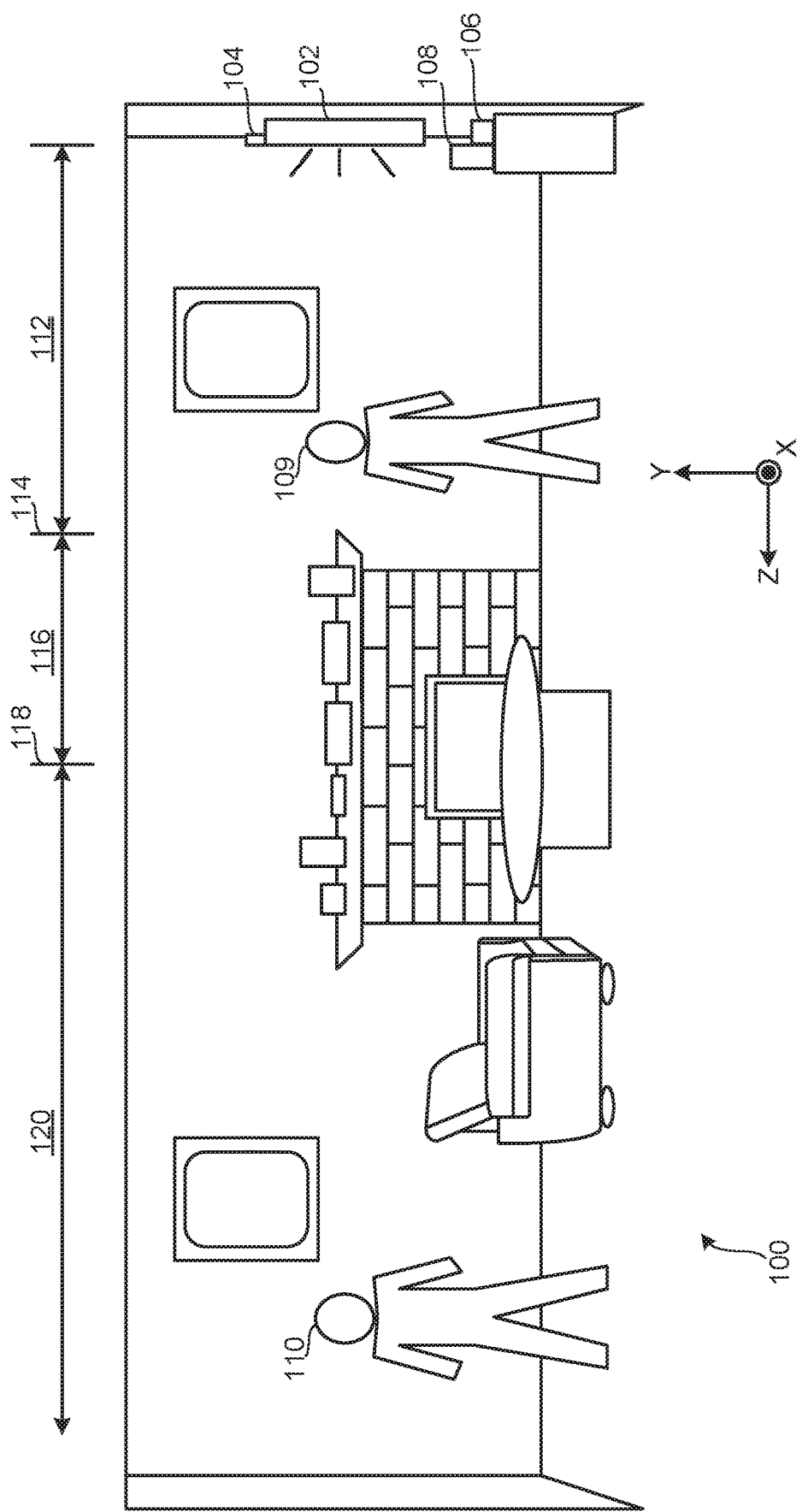
FIG. 1 is an illustration of an example media exposure environment including an example audience measurement device disclosed herein.

There are known applications, systems, and devices (e.g., surveillance systems, consumer behavior monitors deployed in shopping centers, audience measurement devices, etc.) that benefit from the ability to accurately count a number of people in a particular space or environment at a particular time. Such known systems typically capture images of the monitored environment and analyze the images to determine how many people are present at certain times.

To count people in a media exposure environment, some known audience measurement systems attempt to recognize objects as humans and/or to recognize an identity of a detected person in image data representative of the media exposure environment. As used herein, recognition systems include one or more devices, one or more applications, one or more algorithms, etc. tasked with recognizing and/or detecting one or more aspects of image data representative of an environment and/or occupants of the environment. In some known systems, recognition systems include devices, applications, algorithms, etc. tasked with determining that a portion of image data represents a particular type of object such as, for example, a body part (e.g., an arm, a hand, a leg, a head, a torso, etc.). In some known systems, recognition systems include devices, applications, algorithms, etc. tasked with determining that an object, such as a face, belongs to a certain individual. That is, in some known systems, recognition systems include identification systems that, for example, verify and/or detect an identity of a known person. In some known examples, recognition systems include devices, applications, algorithms, etc. tasked with identifying a gesture (e.g., a hand movement, a body motion, etc.) performed by a detected person.

In some traditional systems, the audience measurement system maintains a tally for each frame of image data to reflect an amount of people in the environment at a time corresponding to a respective frame. Recognition of an object as a human in a frame of image data causes these traditional audience measurement devices to increment the tally associated with that frame. Some such systems do not attempt to identify the person, but instead maintain a tally of persons and prompt the audience to self identify when a change in the count occurs. In examples when face detection is employed, faces of people may be undetected or unrecognized due to, for example, partial visibility, lighting conditions, obscuring of the face due to eating or drinking, or a rotation of a head relative to a camera capturing the frames, etc. Additionally, faces of people in the media exposure environment may go undetected or unrecognized in such systems due to field of view limitations associated with an image sensor. In other words, the image sensor tasked with captured images of the media exposure environment may not have a wide enough field of view to capture certain faces of people that are being exposed to media. Additionally, a non-human object, such as a picture of a human face hanging on a wall, is sometimes mistaken for a human face in such known systems, thereby improperly inflating the tally for the corresponding frame.

These and other limitations and/or inaccuracies of known systems can lead to an inaccurate tally of people for individual frames. An inaccurate tally of people in a frame can negatively affect the accuracy of media exposure data generated using the tally. For example, an audience measurement system counting the people in a room may also be collecting media identifying information to identify media being presented (e.g., aurally and/or visually) in the room. With the identification of the media and the amount of people in the room at a given date and time, the audience measurement system can indicate how many people were exposed to the specific media and/or associate the demographics of the people with the specific exposure to determine audience characteristics for the specific media. An audience measurement entity (e.g., The Nielsen Company (US), LLC) can calculate ratings for a piece of media detected in an environment by correlating the piece of media with presence information detected in the environment at times corresponding to a detection of the piece of media. If face(s) are not detected or recognized as faces, the exposure data for the identified media may be under counted (e.g., the media is credited with less viewers/listeners than had actually been exposed to the media). Alternatively, if false positives are detected, the exposure data for the identified media may be overstated (e.g., the media is credited with more viewers/listeners than had actually been exposed to the media).

Recent developments in the capture and processing of three-dimensional data have improved recognition systems that previously relied solely on two-dimensional image data. That is, systems tasked with, for example, recognizing objects as people, determining an identity of a person, and/or identifying a gesture being made by a person have benefited from three-dimensional imaging technology that has improved the accuracy, efficiency, and capabilities of such systems. For example, some three-dimensional data processing involves generating a skeletal framework representative of a detected person. The skeletal framework is especially useful in tracking movements of a person and/or identifying gestures made by the person. Further, capture and processing of three-dimensional data can provide a more accurate identification of an object as a body part (e.g., an arm, a hand, a head, a leg, etc.) than two-dimensional data. Further, capture and processing of three-dimensional data can provide a more accurate identification of a known person than two dimensional data. Further, capture and processing of three-dimensional data improves an ability to distinguish actual human faces from face-like patterns, such as painting, pictures, fabrics including face depictions, etc.

Examples disclosed herein recognize that the advantages provided by using three-dimensional data to recognize objects as people and/or identify people are less significant (relative to the use of two-dimensional data) when depth values of the three-dimensional data are beyond a certain distance (which may vary depending on a particular sensor used to capture the three-dimensional data and/or a particular processing technique). In other words, examples disclosed herein recognize that three-dimensional data and the processing thereof improve recognition of objects to a first degree when the objects are within a threshold distance from the three-dimensional sensor and to a second, less significant degree when the objects are outside the threshold distance from the three-dimensional sensor. Accordingly, a greater distance between the three-dimensional sensor and the analyzed object leads to less accurate conclusions from analyses generated by three-dimensional based (3D-based) recognition systems.

For example, a 3D-based recognition analysis tasked with recognizing objects as human body parts (e.g., arms, legs, heads, hands, etc.) may have a first accuracy rating (e.g., a percentage of true positives, a percentage of false positives, a percentage of false negatives, and/or a percentage of true negatives) for recognition of objects located between one (1) foot and six (6) feet away from a three-dimensional sensor, a second accuracy rating for recognition of objects located between six (6) feet and ten (10) feet away from the three-dimensional sensor, and a third accuracy rating for recognition of objects located ten (10) feet or greater from the three-dimensional sensor. In such instances, the first accuracy rating is greater than the second accuracy rating, and the second accuracy rating is greater than the third accuracy rating. Examples disclosed herein recognize that in some instances, the second and/or third accuracy ratings of the 3D-based recognition analysis may be less than a fourth accuracy rating associated with a two-dimensional based (2D-based) recognition analysis. That is, examples disclosed herein recognize that in certain instances (e.g., when a subject object is greater than a threshold distance away from a sensor) a 2D-based recognition analysis may be better suited (e.g., may provide more accurate results) for object recognition than a 3D-based recognition analyses. The advantages of 2D-based recognition analyses over the 3D-based recognition analyses are especially significant for relatively thin objects (e.g., arms, hands, etc.) at relatively far distances from the corresponding sensor.

Further, examples disclosed herein recognize that 2D-based recognition analyses are often more costly in terms of computational resources than 3D-based recognition analyses. In particular, some 2D-based recognition analyses often involve complex processing techniques that consume more resources (e.g., processing cycles, memory, etc.) than 3D-based recognition analyses. For example, while many 2D-based recognition analyses involve large amounts of comparisons of large amounts of image data (e.g., pixel intensities) to determine which portions of the image data (if any) correspond to a person, many 3D-based recognition analyses are able to reference collection(s) of shape libraries to determine whether depth information corresponds to a person. Thus, the additional dimension used for the 3D-based analyses enable more efficient recognition of objects.

Example methods, apparatus, and/or articles of manufacture disclosed herein utilize three-dimensional recognition analysis and two-dimensional analysis to more accurately and more efficiently recognize objects in an environment than previous recognition systems. In particular, example methods, apparatus, and/or articles of manufacture disclosed herein capture three-dimensional data of the environment via a three-dimensional sensor and determine whether the environment includes an object within a threshold distance from the three-dimensional sensor. The threshold distance used by examples disclosed herein corresponds to, for example, a distance at which the accuracy rating (e.g., a percentage) of the 3D-based recognition analysis falls below a threshold accuracy. For object(s) detected within the threshold distance from the three-dimensional sensor, example methods, apparatus and/or articles of manufacture disclosed herein execute a 3D-based recognition analysis to determine, for example, whether the object(s) are people and/or body part(s) of people. Thus, examples disclosed herein execute the 3D-based recognition analysis on objects for which the threshold accuracy can be achieved. For each one of the object(s) determined to correspond to a person via the 3D-based recognition analysis, example methods, apparatus, and/or articles of manufacture disclosed herein increment a people tally associated with the environment (e.g., for a particular frame corresponding to the captured three-dimensional data). Thus, the people tally generated by examples disclosed herein for objects located within the threshold distance have an accuracy aligned with the high accuracy provided by the 3D-based recognition analysis.

For portions of the environment having depth information in the captured three-dimensional data greater than the threshold distance, example methods, apparatus, and/or articles of manufacture disclosed herein execute a 2D-based recognition analyses on captured two-dimensional data (e.g., via a two-dimensional image sensor) to determine whether any people are present in the environment at distances greater than the threshold distance associated with the 3D-based recognition analysis. Put another way, examples disclosed herein execute the 2D-based recognition analysis for objects located at distances at which the accuracy of the 3D-based recognition analyses falls below the threshold accuracy. As described in greater detail below, example methods, apparatus, and/or articles of manufacture disclosed herein trigger execution of the 2D-based recognition analysis in response to one or more example detections and/or events. For example, some examples disclosed herein trigger the 2D-based recognition analysis in connection with the capture of each frame of captured image data. Additionally or alternatively, some examples disclosed herein trigger the 2D-based recognition analysis in response to a predefined time interval elapsing (e.g., according to a schedule). Additionally or alternatively, some examples disclosed herein trigger the 2D-based recognition analysis in response to the 3D-based recognition analysis determining that a person has moved from within the threshold distance from the sensor to a distance outside the threshold distance. Some such examples disclosed herein use the location of the person that has moved beyond the threshold distance (as recorded via the 3D-based recognition analysis) to focus the 2D-based recognition analysis on a particular area of the environment, thereby avoiding the need to scan the entire environment in connection with the 2D-based recognition analysis, which is a computational expensive procedure. In some examples disclosed herein, the 2D-based analysis is only performed in areas beyond the area in which 3D-based analyses have an acceptable level of accuracy. Some disclosed examples use a combination of any two or more of the above triggers (e.g., time based and three-dimensional recognition determination) to trigger the 2D-based analysis.

FIG. 1 is an illustration of an example media exposure environment 100 including an information presentation device 102, an example image capturing device 104, and a meter 106 for collecting audience measurement data. In the illustrated example of FIG. 1, the information presentation device 102 is a television and the media exposure environment 100 is a room of a household (e.g., a room in a home of a panelist such as the home of a "Nielsen family") that has been statistically selected to develop television ratings data for population(s)/demographic(s) of interest. In the illustrated example, one or more persons of the household have registered with an audience measurement entity (e.g., by agreeing to be a panelist) and have provided demographic information to the audience measurement entity to enable associating demographics with viewing activities (e.g., media exposure).

In some examples, the audience measurement entity provides the image capturing device 104 to the household. In some examples, the image capturing device 104 is a component of a media presentation system purchased by the household such as, for example, a camera of a video game system 108 (e.g., Microsoft® Kinect®) and/or piece(s) of equipment associated with a video game system (e.g., a Kinect® sensor). In such examples, the image capturing device 104 may be repurposed and/or data collected by the image capturing device 104 may be repurposed for audience measurement.

In the illustrated example of FIG. 1, the image capturing device 104 is placed above the information presentation device 102 at a position for capturing image data of the environment 100. In some examples, the image capturing device 104 is positioned beneath or to a side of the information presentation device 102 (e.g., a television or other display). In some examples, the image capturing device 104 is integrated with the video game system 108. For example, the image capturing device 104 may collect image data (e.g., three-dimensional data and/or two-dimensional data) using one or more sensors for use with the video game system 108 and/or may also collect such image data for use by the meter 106. In some examples, the image capturing device 104 employs a first type of image sensor (e.g., a two-dimensional sensor) to obtain image data of a first type (e.g., two-dimensional data) and collects a second type of image data (e.g., three-dimensional data) from a second type of image sensor (e.g., a three-dimensional sensor). In some examples, only one type of sensor is provided by the video game system 108 and a second sensor is added by the audience measurement system.

In the example of FIG. 1, the meter 106 is a software meter provided for collecting and/or analyzing the data from the image capturing device 104 and other media identification data collected as explained below. In the illustrated example, the meter 106 is installed in the video game system 108 (e.g., by being downloaded to the same from a network, by being installed at the time of manufacture, by being installed via a port (e.g., a universal serial bus (USB) from a jump drive provided by the audience measurement company, by being installed from a storage disc (e.g., an optical disc such as a BluRay disc, Digital Versatile Disc (DVD) or CD (compact Disk), or by some other installation approach). Executing the meter 106 on the panelist's equipment is advantageous in that it reduces the costs of installation by relieving the audience measurement entity of the need to supply hardware to the monitored household). In other examples, rather than installing the software meter 106 on the panelist's consumer electronics, the meter 106 is a dedicated audience measurement unit provided by the audience measurement entity. In such examples, the meter 106 may include its own housing, processor, memory and software to perform the desired audience measurement functions. In such examples, the meter 106 is adapted to communicate with the image capturing device 104 via a wired or wireless connection. In some such examples, the communications are effected via the panelist's consumer electronics (e.g., via a video game console). In other example, the image capturing device 104 is dedicated to audience measurement and, thus, no direct interaction with the consumer electronics owned by the panelist is involved.

Although the example audience measurement system of FIG. 1 is illustrated in a panelist home, the system can be implemented in additional and/or alternative types of environments such as, for example, a room in a non-statistically selected household (e.g., a non-panelist site), a theater, a restaurant, a tavern, a retail location, an arena, etc. For example, the environment may not be associated with a panelist of an audience measurement study, but instead may simply be an environment associated with a purchased XBOX® and/or Kinect® system In some examples, the example audience measurement system of FIG. 1 is implemented, at least in part, in connection with additional and/or alternative types of media presentation devices such as, for example, a radio, a computer, a tablet, a cellular telephone, and/or any other communication device able to present media to one or more individuals.

In the example shown in FIG. 1, first and second persons 109 and 110 are present in the environment 100. In the illustrated example, the first person 109 is located in a near range set of distances 112 defined by a location of a three-dimensional sensor of the image capturing device 104 in the example of FIG. 1, and a first threshold distance 114 extending away from the imaging capturing device 104 along the z-axis shown in FIG. 1. The example environment 100 of FIG. 1 also includes a mid-range set of distances 116 defined by a second threshold distance 118 extending away from the image capturing device 104 along the z-axis and beginning at the end of the first threshold distance 114. The example environment 100 of FIG. 1 also includes a far range set of distances 120 that includes distances greater than the second threshold distance 118 away from the image capturing device 104.

Figure 1A:
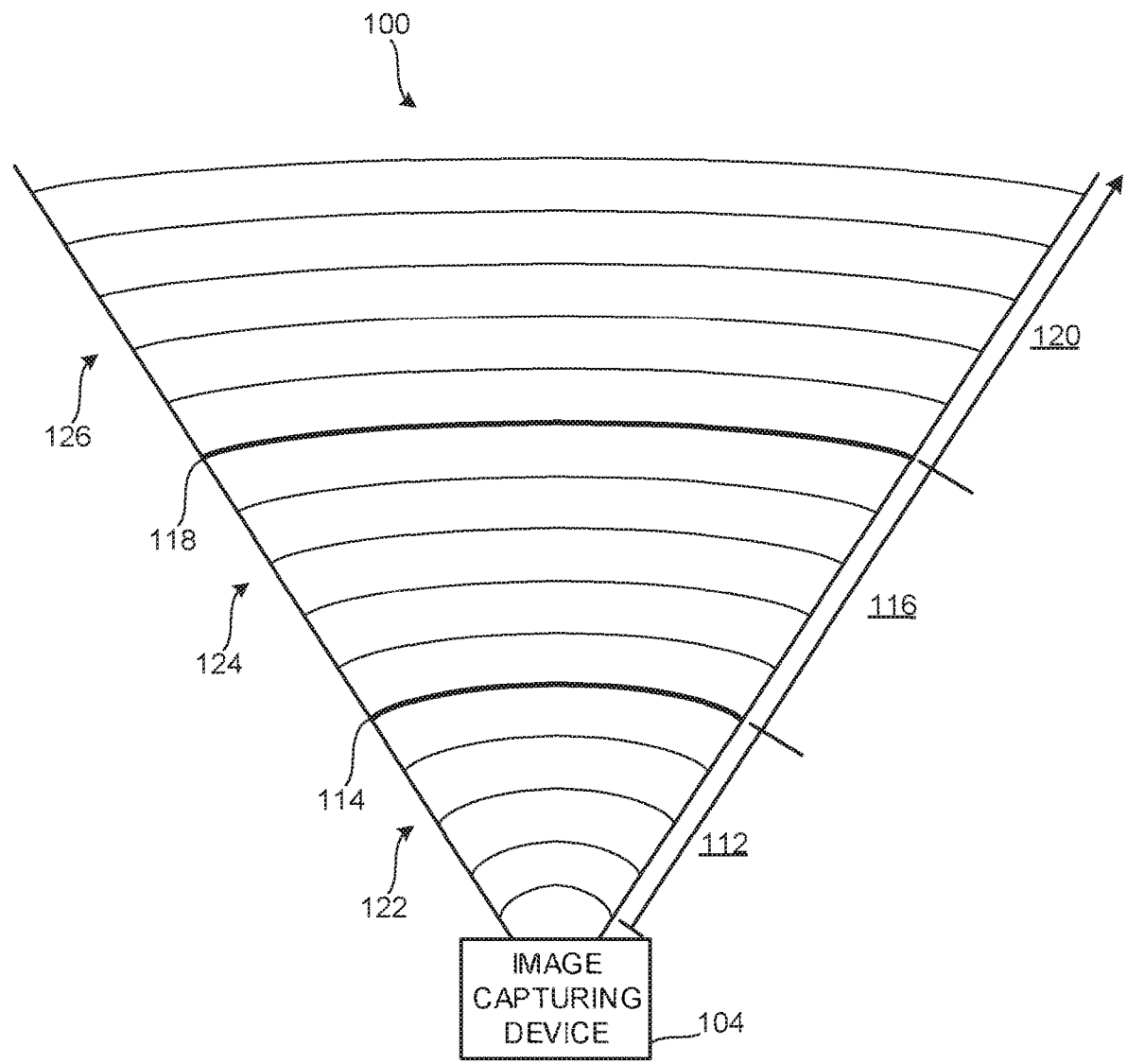
FIG. 1A is another illustration of the example media exposure environment of FIG. 1.

FIG. 1A illustrates the example media exposure environment 100 of FIG. 1 from a different perspective. In particular, the example image capturing device 104 captures data across a field of view illustrated in FIG. 1A. As shown in FIG. 1A, a first detection area 122 is defined by the first threshold 114 and the field of view to include the near range set of distances 112. Further, a second detection area 124 is defined by the first threshold 114, the second threshold 118, and the field of view to include the mid-range set of distances 116. Further, a third detection area 126 is defined by the second threshold 118 and the field of view to include the far range set of distances 120. As described in detail below in connection with FIG. 2, the example meter 106 of FIG. 1 applies different types of recognition analyses to determine whether objects correspond to people depending on, for example, in which one of the detection areas 122-126 or distance ranges 112, 116 and 120 of the environment 100 the objects are located.

Figure 2A:
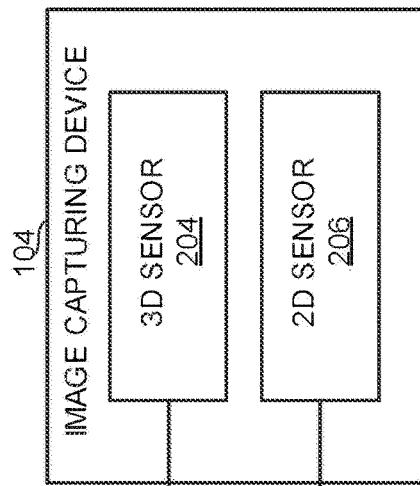
FIG. 2A is a block diagram of an example implementation of the example image capturing device of FIG. 1.
Figure 2:
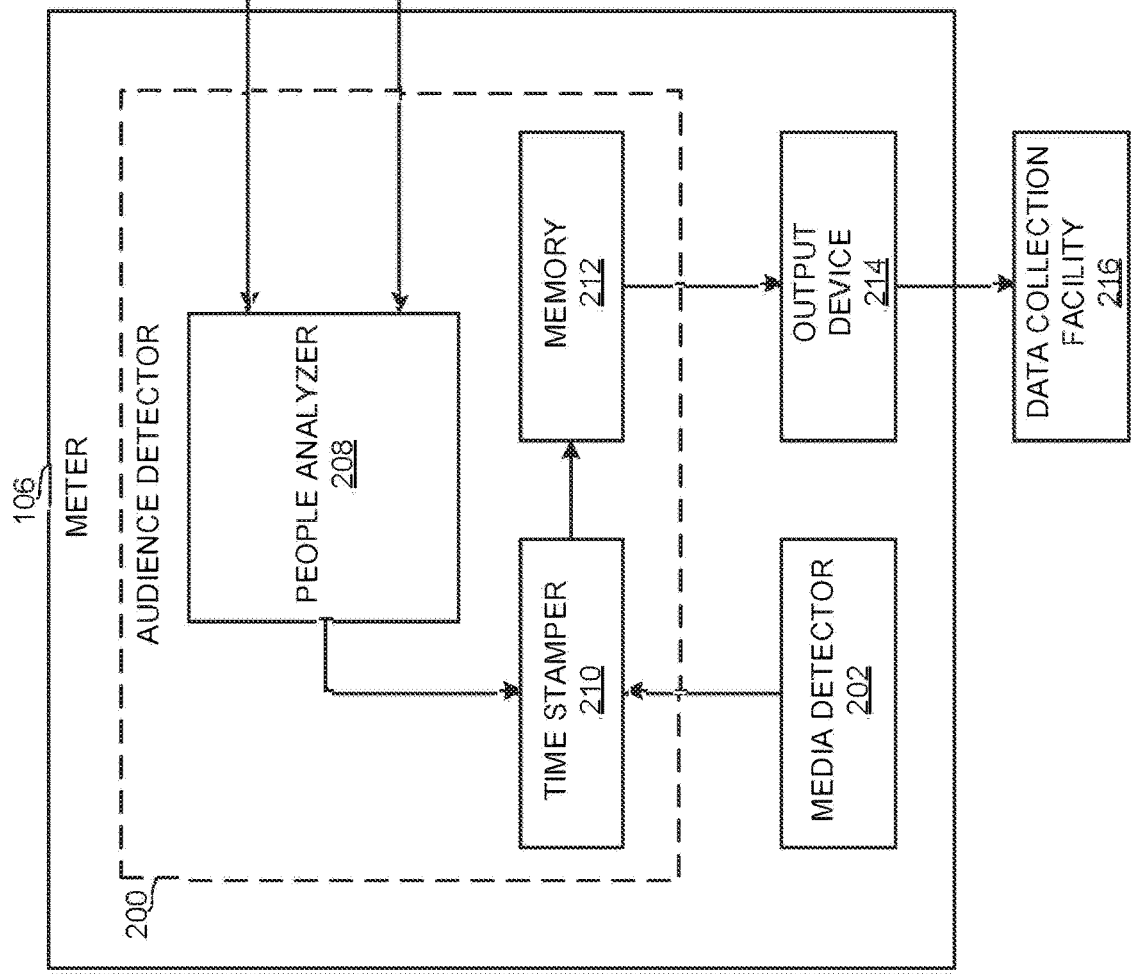
FIG. 2 is a block diagram of an example implementation of the example audience measurement device of FIG. 1.

FIG. 2 illustrates an example implementation of the meter 106 of FIG. 1. FIG. 2A illustrates an example implementation of the image capturing device 104 of FIG. 1. The example meter 106 of FIG. 2 includes an audience detector 200 to develop audience composition information regarding, for example, presence of people in the example environment 100 of FIG. 1. The example meter 106 of FIG. 2 also includes a media detector 202 to collect information regarding, for example, media presented in the environment 100 of FIG. 1. An example implementation of the media detector 202 is discussed further below. The example image capturing device 104 of FIG. 2A includes a three-dimensional sensor 204 capable of capturing three-dimensional data representative of the environment 100 and a two-dimensional sensor 206 capable of capturing two-dimensional data representative of the environment 100. While the example image capturing device 104 of FIG. 2A includes the three-dimensional sensor 204 and the two-dimensional sensor 206, the example meter 106 may additionally or alternatively receive three-dimensional data and/or two-dimensional data representative of the environment 100 from a different source. For example, the image capturing device 104 may include the two-dimensional sensor 206 and may receive three-dimensional data representative of the environment 100 from a three-dimensional sensor implemented by a different component in communication with the example meter 106 such as, for example, a video game system (e.g., Microsoft® Kinect®) owned by the panelist. In some examples, the image capturing device 104 is implemented by a Kinnect® sensor which includes both the two-dimensional sensor 206 and the three-dimensional sensor 204.

The example three-dimensional sensor 204 of FIG. 2A projects an array or grid of dots (e.g., via one or more electromagnetic radiation beams) onto objects of the environment 100. The dots of the array projected by the example three-dimensional sensor 204 have respective x-axis coordinates and y-axis coordinates and/or some derivation thereof. The example three-dimensional sensor 204 of FIG. 2A uses feedback received in connection with the dot array to calculate depth values associated with different dots projected onto the environment 100. Thus, the example three-dimensional sensor 204 generates a plurality of data points. Each such data point has a first component representative of an x-axis position in the environment 100, a second component representative of a y-axis position in the environment 100, and a third component representative of a z-axis position in the environment 100. As used herein, the x-axis position of an object is referred to as a horizontal position, the y-axis position of the object is referred to as a vertical position, and the z-axis position of the object is referred to as a depth position relative to the image capturing device 104. In the illustrated example, the array projected onto the environment 100 is an infrared array. The example image capturing device 104 of FIG. 2A may utilize additional or alternative type(s) of three-dimensional sensor(s) to capture three-dimensional data representative of the environment 100 such as, for example, image capturing devices employing structured lighting, time-of-flight of light, and/or stereo cameras.

The example three-dimensional sensor 204 of FIG. 2A is implemented by a laser that projects a plurality grid points onto the environment 100. The example two-dimensional sensor 206 of FIG. 2A is implemented by a sensor and/or camera that captures two-dimensional image data representative of the environment 100. In some examples, the two-dimensional sensor 206 includes an infrared imager, a complimentary metal-oxide semiconductor (CMOS) camera, and/or a charge coupled device (CCD) camera.

In some examples, the sensors three-dimensional sensor 204 and/or the two-dimensional sensor 206 only capture data when the information presentation device 102 is in an "on" state and/or when the media detector 202 determines that media is being presented in the environment 100 of FIG. 1.

The example audience detector 200 of FIG. 2 includes a people analyzer 208, a time stamper 210 and a memory 212. In the illustrated example of FIG. 2, the data generated by the example three-dimensional sensor 204 and/or the example two-dimensional sensor 206 is conveyed to the example people analyzer 208. The example people analyzer 208 of FIG. 2 calculates a people count corresponding to different time periods (e.g., one minute intervals, thirty second intervals, etc.) for the example environment 100 of FIG. 1. The manner in which the example people analyzer 208 of FIG. 2 generates the people counts is described in detail below in connection with FIGS. 3-6.

The example people analyzer 208 of FIG. 2 outputs, for example, calculated people counts or tallies to the example time stamper 210. The time stamper 210 of the illustrated example includes a clock and a calendar. The example time stamper 210 associates a time period (e.g., 1:00 a.m. Central Standard Time (CST) to 1:01 a.m. CST) and date (e.g., Jan. 1, 2012) with each calculated people count by, for example, appending the period of time and date information to an end of the people data. In some examples, the time stamper 210 applies a single time and date rather than a period of time. A data package (e.g., the people count, the time stamp, the image data, etc.) is stored in the memory 212.

The example memory 212 of FIG. 2 may include a volatile memory (e.g., Synchronous Dynamic Random Access Memory (SDRAM), Dynamic Random Access Memory (DRAM), RAMBUS Dynamic Random Access Memory (RDRAM, etc.) and/or a non-volatile memory (e.g., flash memory). The example memory 212 of FIG. 2 may also include one or more mass storage devices such as, for example, hard drive disk(s), compact disk drive(s), digital versatile disk drive(s), etc. When the example meter 106 is integrated into, for example, the video game system 108 of FIG. 1, the meter 106 may utilize memory of the video game system 108 to store information such as, for example, the people counts, the image data, etc.

The example time stamper 210 of FIG. 2 also receives data from the example media detector 202. The example media detector 202 of FIG. 2 detects presentation(s) of media in the media exposure environment 100 and/or collects identification information associated with the detected presentation(s). For example, the media detector 202, which may be in wired and/or wireless communication with the information presentation device 102 (e.g., a television), the video game system 108, an STB associated with the information presentation device 102, and/or any other component of FIG. 1, can identify a presentation time and/or a source of a presentation. The presentation time and the source identification data may be utilized to identify the program by, for example, cross-referencing a program guide configured, for example, as a look up table. In such instances, the source identification data is, for example, the identity of a channel (e.g., obtained by monitoring a tuner of an STB or a digital selection made via a remote control signal) currently being presented on the information presentation device 102.

Additionally or alternatively, the example media detector 202 can identify the presentation by detecting codes and/or watermarks embedded with or otherwise conveyed (e.g., broadcast) with media being presented via an STB and/or the information presentation device 102. As used herein, a code is an identifier that is transmitted with the media for the purpose of identifying and/or for tuning to (e.g., via a packet identifier (PID) header and/or other data used to tune or select packets in a multiplexed stream of packets) the corresponding media. Codes may be carried in the audio, in the video, in metadata, in a vertical blanking interval, in a program guide, in content data, or in any other portion of the media and/or the signal carrying the media. In the illustrated example, the media detector 202 extracts the code(s) from the media. In other examples, the media detector may collect samples of the media and export the samples to a remote site for detection of the code(s).

Additionally or alternatively, the media detector 202 can collect a signature representative of a portion of the media. As used herein, a signature is a representation of some characteristic of the signal carrying or representing one or more aspects of the media (e.g., a frequency spectrum of an audio signal). Signatures may be thought of as fingerprints of the media. Collected signature(s) can be compared against a collection of reference signatures of known media (e.g., content and/or advertisements) to identify tuned media In some examples, the signature(s) are generated by the media detector 202. Additionally or alternatively, the media detector 202 collects samples of the media and exports the samples to a remote site for generation of the signature(s). In the example of FIG. 2, irrespective of the manner in which the media of the presentation is identified (e.g., based on tuning data, metadata, codes, watermarks, and/or signatures), the media identification information is time stamped by the time stamper 210 and stored in the memory 212.

In the illustrated example of FIG. 2, an output device 214 periodically and/or aperiodically exports the audience identification information and/or the media identification information from the memory 212 to a data collection facility 216 via a network (e.g., a local-area network, a wide-area network, a metropolitan-area network, the Internet, a digital subscriber line (DSL) network, a cable network, a power line network, a wireless communication network, a wireless mobile phone network, a Wi-Fi network, etc.). In some examples, the example meter 106 utilizes the communication capabilities (e.g., network connections) of the video game system 108 to convey information to, for example, the data collection facility 216. In the illustrated example of FIG. 2, the data collection facility 216 is managed and/or owned by an audience measurement entity (e.g., The Nielsen Company (US), LLC). The audience measurement entity associated with the example data collection facility 216 of FIG. 2 utilizes the people tallies generated by the people analyzer 208 in conjunction with the media identifying data collected by the media detector 202 to generate exposure information. The information from many panelist locations may be collected and analyzed to generate ratings representative of media exposure by one or more populations of interest.

While example manners of implementing the image capturing device 104 and the meter 106 of FIG. 1 have been illustrated in FIGS. 2 and 2A, one or more of the elements, processes and/or devices illustrated in FIGS. 2 and/or 2A may be combined, divided, re-arranged, omitted, eliminated and/or implemented in any other way. Further, the example audience detector 200, the example media detector 202, the example three-dimensional sensor 204, the example two-dimensional sensor 206, the example people analyzer 208, the example time stamper 210, the example output device 214, and/or, more generally, the example meter 106 of FIG. 2 and/or the example image capturing device 104 may be implemented by hardware, software, firmware and/or any combination of hardware, software and/or firmware. Thus, for example, any of the example audience detector 200, the example media detector 202, the example three-dimensional sensor 204, the example two-dimensional sensor 206, the example people analyzer 208, the example time stamper 210, the example output device 214, and/or, more generally, the example meter 106 of FIG. 2 and/or the example image capturing device 104 of FIG. 2A could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the system or apparatus claims of this patent are read to cover a purely software and/or firmware implementation, at least one of the example audience detector 200, the example media detector 202, the example three-dimensional sensor 204, the example two-dimensional sensor 206, the example people analyzer 208, the example time stamper 210, the example output device 214, and/or, more generally, the example meter 106 of FIG. 2 and/or the example image capturing device 104 of FIG. 2A are hereby expressly defined to include a tangible computer readable storage medium such as a storage device or storage disc storing the software and/or firmware. Further still, the example meter 106 of FIG. 2 and/or the example image capturing device 104 may include one or more elements, processes and/or devices in addition to, or instead of, those illustrated in FIGS. 2 and/or 2A, and/or may include more than one of any or all of the illustrated elements, processes and devices.

Figure 3:
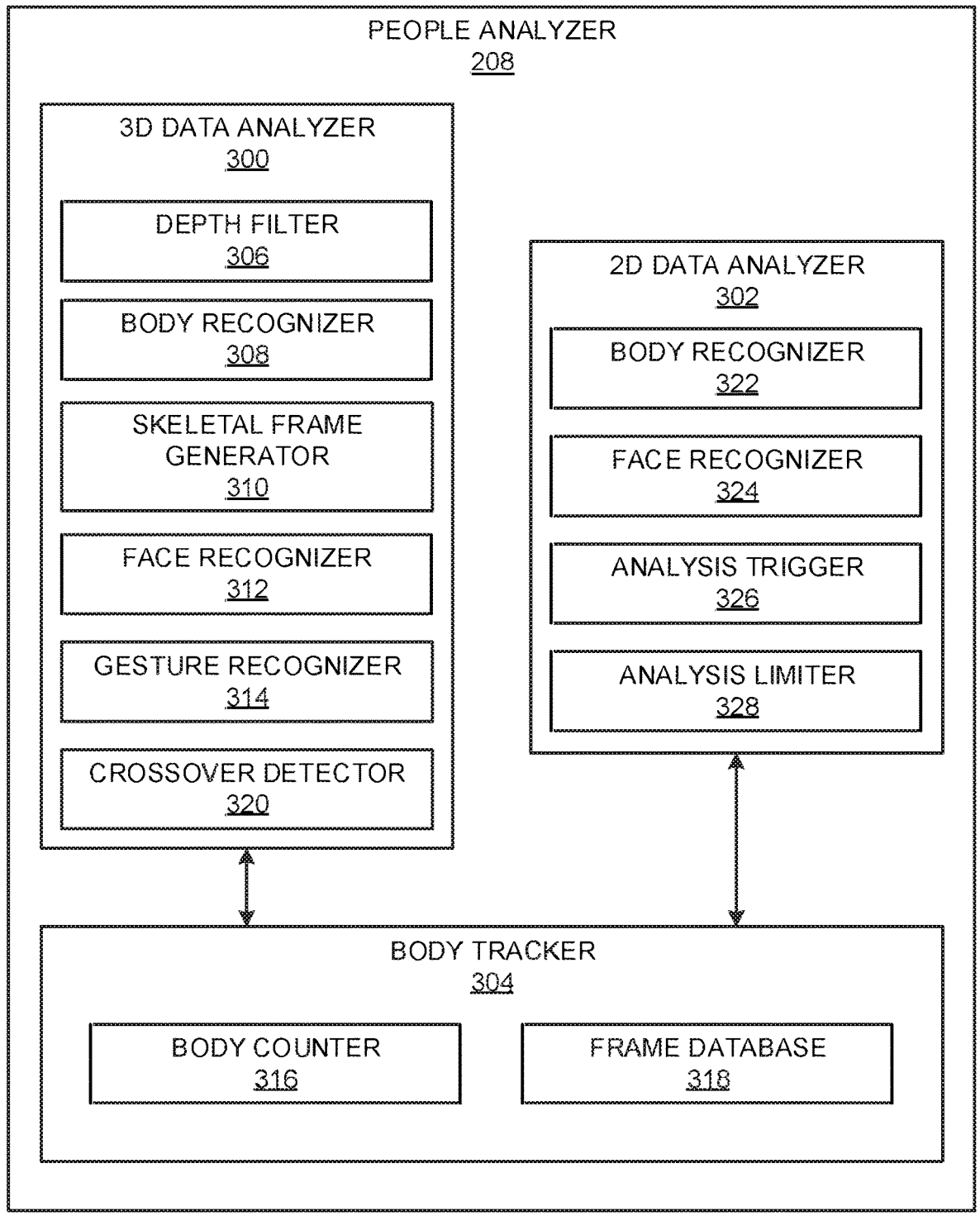
FIG. 3 is a block diagram of an example implementation of the example people counter of FIGS. 1 and/or 2.

FIG. 3 illustrates an example implementation of the example people analyzer 208 of FIG. 2. The example people analyzer 208 of FIG. 2 generates a people count or tally representative of a number of people in the media exposure environment 100 of FIG. 1 for frame(s) of captured image data. The rate at which the example people analyzer 208 of FIG. 3 generates people counts is configurable. In the illustrated example of FIG. 3, the example people analyzer 208 instructs the example three-dimensional sensor 204 of FIG. 2A to capture three-dimensional data representative of the environment 100 every five seconds. However, the example people analyzer 208 can capture and/or analyze data at any suitable rate. As described in detail below, the example people analyzer 208 of FIG. 3 utilizes a three-dimensional data analyzer 300 and a two-dimensional data analyzer 302 to detect people in the environment 100. The example people analyzer 208 of FIG. 3 also includes a body tracker 304 to store information generated by the data analyzers 300 and 302 and information related thereto. Further, as described in detail below, the example body tracker 304 of FIG. 3 enables the two-dimensional data analyzer 302 to focus a corresponding analysis on areas of interest in the environment 100, rather than analyzing the entirety of the environment 100.

The example three-dimensional data analyzer 300 of FIG. 3 receives frames of three-dimensional data and executes one or more 3D-based recognition analyses on objects appearing in the environment 100 within one or more threshold distances from the three-dimensional sensor 204. As described above, the received three-dimensional data includes data points each having a horizontal component, a vertical component, and a depth component. The example three-dimensional data analyzer 300 includes a depth filter 306 to analyze the depth component of the data points. The example depth filter 306 of FIG. 3 determines whether objects of the environment 100 corresponding to the data points fall within the first detection area 122 (e.g., at one of the near range set of distances 112), the second detection area 124 (e.g., at one of the mid-range set of distances 116), or the third detection area 126 (e.g., at one of the far range set of distances 120) of FIG. 1A In particular, the example depth filter 306 determines whether the depth components of the respective data points are (1) less than the first threshold distance 114, (2) greater than the first threshold distance 114 but less than the second threshold distance 118, or (3) greater than the second threshold distance 118.

In the illustrated example, the depth filter 306 of FIG. 3 designates the data points corresponding to objects of the environment 100 located in the first detection area 122 for further 3D-based recognition analysis via the example three-dimensional data analyzer 300. Although the example depth filter 306 of FIG. 3 designates the data points found in the first detection area 122 for 3D-based recognition analysis, such data points may be additionally or alternatively be designated for 2D-based recognition analysis. Further, in some examples, the first detection area 122 includes a subset of distances from the image capturing device 104 for which three-dimensional data processing is undesirable due to, for example, limitations on capture of three-dimensional data and/or processing thereof. Such a subset of distances may include, for example, distances within one (1) foot or within one and a half (1.5) feet from the image capturing device 104. In such instances, the example depth filter 306 designates the data points in the subset of distances for 2D-based recognition. Alternatively, the example depth filter 306 of FIG. 3 may designate any data point detected within the first detection area 122 for further 3D-based recognition analysis.

For data points located in the second detection area 124, the example depth filter 306 of FIG. 3 designates the data for further analysis via the example three-dimensional analyzer 300 and for analysis via the two-dimensional data analyzer 302. That is, in the illustrated example of FIG. 3, the data points falling in the mid-range set of distances 116 are subject to a 2D-based recognition analysis in addition to a 3D-based recognition analysis.

The example depth filter 306 of FIG. 3 filters the data points corresponding to objects of the environment 100 located in the third detection area 126 (e.g., at one of the far range set of distances 120) from further analysis via the example three-dimensional data analyzer 300. In the illustrated example of FIG. 3, the accuracy of the three-dimensional data analyzer 300 is below a threshold (e.g., an accuracy percentage) for objects located in the third detection area 126. Thus, the data points associated with third detection area 126 are not further analyzed by the example three-dimensional data analyzer 300. As a result, people counts having an accuracy less than a threshold are avoided. That is, the example three-dimensional data analyzer 300 only generates people counts greater than or equal to the relatively high accuracy rating corresponding to 3D-based recognition of near objects. Alternatively, the example three-dimensional data analyzer 300 may analyze the data points corresponding to the far range 120 and the example depth filter 306 can prevent the results of such analysis from contributing or affecting the people counts generated by the example three-dimensional data analyzer 300. For example, the depth filter 306 may discard analysis results for data points found in the far range 120 by preventing a write to memory associated with such analysis results or by writing such results to a separate variable (e.g., an untrustworthy tally) to be used, for example, for diagnostic purposes.

In some examples, the three-dimensional sensor 204 supports additional or alternative ranges and/or the example depth filter 306 designates the data points for further analysis in additional or alternative manners. For example, the environment 100 may only include a near range (e.g., a combination of the first and second detection areas 122, 124 in FIG. 1A) and a far range (e.g., the third detection area 126 of FIG. 1A). In such instances, the example depth filter 306 of FIG. 3 only designates data points corresponding to objects located in the near range for further analysis via the example three-dimensional data analyzer 300.

The example body recognizer 308 of FIG. 3 receives the data points determined to be suitable for further processing via the three-dimensional data analyzer 300 by the example depth filter 306. The example body recognizer 308 of FIG. 3 implements one or more 3D-based recognition analyses capable of identifying a set of data points as corresponding to a body and/or a body part of a person. For example, the body recognizer 308 of FIG. 3 implements a first 3D-based recognition analysis to determine whether a set of three-dimensional data points corresponds to a human head, a second 3D-based recognition analysis to determine whether a set of three-dimensional data points corresponds to a human arm, a third 3D-based recognition analysis to determine whether a set of three-dimensional data points corresponds to a human torso, etc. The recognition analys(es) implemented by the example body recognizer 308 of FIG. 3 are based on, for example, three-dimensional shapes known to correspond to the corresponding body part(s) and/or a training algorithm that improves over time based on learned information.

When the example body recognizer 308 of FIG. 3 recognizes a set of data points as corresponding to a person, the example body recognizer 308 conveys an indication of such a recognition to a body counter 316 of the example body tracker 304. The example body counter 316 of FIG. 3 maintains counts for respective frames of image data representative of the environment 100 of FIG. 1. The counts generated and maintained by the example body counter 316 are stored in association with the corresponding frames in a frame database 318 of the example body tracker 304. In some examples, the frames of image data are also stored in the example frame database for purposes of, for example, record keeping and/or subsequent verification procedures.

Figure 4:
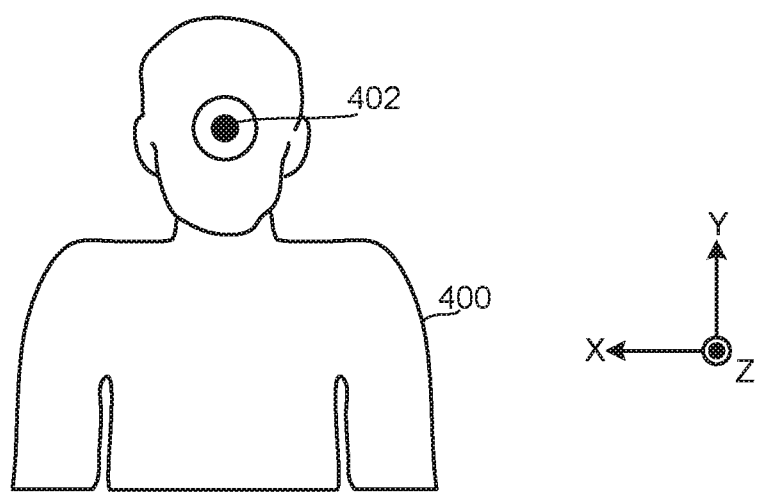
FIG. 4 is an illustration of an example face rectangle tracked by the example people counter of FIGS. 1, 2 and/or 3.

In the illustrated example of FIG. 3, the body recognizer 308 also conveys a coordinate of the detected body to a crossover detector 320 of the example three-dimensional data analyzer 300. The coordinate of the detected body is indicative of a location in the environment 100 of the body and/or body part detected by the body recognizer 308. FIG. 4 illustrates an example person 400 detected by the example body recognizer 308 and an example coordinate 402 conveyed to the example crossover detector 320. The example of FIG. 4 corresponds to an instance of the body recognizer 308 detecting a head of the person 400 and, thus, the coordinate 402 corresponds to a center of the detected head. However, when the example body recognizer 308 of FIG. 3 recognizes a different body part, the coordinate conveyed to the crossover detector 320 is the coordinate that corresponds to that body part. The example coordinate 402 of FIG. 4 includes a horizontal component (x-axis) and a vertical component (y-axis) corresponding to a two-dimensional location of the detected person 400 in the environment 100.

The example crossover detector 320 maintains records of the coordinates received in connection with chronologically captured frames and uses the same to detect a person travelling from the first detection area 122 (e.g., at one of the near range set of distances 112) to the second detection area 124 (e.g., at one of the mid-range set of distances 116) and/or from the second detection area 124 to the third detection area 126 (e.g., at one of the far range set of distances 120) of the environment 100. That is, the example crossover detector 320 identifies instances of a person crossing over from a first range designated for a 3D-based recognition analysis to a second range designated for a 2D-based recognition analysis (in addition to or in lieu of a 3D-based recognition analysis). For example, the crossover detector 320 of FIG. 3 may determine that a change in depth value of a three-dimensional data point at the provided coordinate from a first frame to a second frame crosses over one of the threshold distances 114 and 118 of FIG. 1. As described in detail below in connection with the two-dimensional data analyzer 302, the example crossover detector 320 of FIG. 3 provides the location (e.g., x-y coordinate) of a person crossing over to a farther range such that a 2D-based recognition analysis can be focused on the corresponding area of the environment 100, thereby reducing the amount of processing of two-dimensional data by avoiding the need for the 2D-based recognition analysis to scan the entirety of the environment 100.

When the example body recognizer 308 of FIG. 3 determines that a body is present in the environment 100, the type of detected body part and the location thereof is conveyed to the skeletal frame generator 310. The example skeletal frame generator 310 of FIG. 3 analyzes the three-dimensional data points to generate a representation of a current shape of the detected body. For example, the skeletal framework generator 310 of FIG. 3 generates a plurality of centerline points corresponding to detected body parts and the relation of the detected body parts to other body parts of the detected person. In some examples, the skeletal framework generator 310 determines a posture of the person. For example, the skeletal framework generator 310 may determine that the detected body is standing, sitting, lying down, etc.

Further, when the example body recognizer 308 of FIG. 3 determines that a body is present in the environment 100, the body recognizer 308 and/or the skeletal framework generator 310 conveys information to the face recognizer 312. In the illustrated example, the face recognizer 312 attempts to identify the detected body as belonging to one of a plurality of known people, such as a family of the household, frequent visitors of the household, etc. The example face recognizer 312 employs any suitable facial recognition technique and/or procedure based on three-dimensional data points. When the example face recognizer 312 identifies the detected body as corresponding to a known person, the example face recognizer 312 conveys the detected identity of the person (e.g., an identifier) to the example body tracker 304. In the illustrated example of FIG. 3, the identity of the detected body is stored in the frame database 318 in association with the appropriate frame of data and/or timestamp.

Further, when the example body recognizer 308 of FIG. 3 determines that a body is present in the environment 100, the type of detected body part, the location of the detected body part, and/or data generated by the example skeletal framework generator 310 is conveyed to the gesture recognizer 314. The example gesture recognizer 314 uses data associated with a single frame and/or data related to several consecutive frames to determine whether the detected body is making a known gesture (e.g., a gesture corresponding to one or more of a collection of predefined gestures). For example, the detected person may be in the act of making a gesture towards the information presentation device 102 in connection with the video game system 108 of FIG. 1. Such gestures include, for example, hand motions, body motions, finger configuration, etc. In such instances, the example gesture recognizer 314 compares the three-dimensional data points to data known to correspond to certain gestures. In some examples, information generated by the example gesture recognizer 314 is conveyed to the example body tracker 304 for storage in, for example, the frame database 318 in association with a timestamp.

Thus, the example three-dimensional data analyzer 300 of FIG. 3 performs one or more 3D-based recognition analyses on data points determined to correspond to objects located within one or more threshold distances from the example three-dimensional sensor 204 of FIG. 2A. In the illustrated example of FIG. 3, the three-dimensional data analyzer 300 performs the 3D-based recognition analys(es) for ones of the data points captured by the three-dimensional sensor 204 having a depth value falling in the first or second detection areas 122 and 124 of FIG. 1A (e.g., in the near range 112 or the mid-range 116).

For ones of the data points having a depth value falling in the second detection area 124 or the third detection area of FIG. 1, the example two-dimensional data analyzer 302 of FIG. 3 initiates one or more 2D-based recognition analyses. Further, as described above, the two-dimensional data analyzer 302 may initiate a 2D-based recognition analysis for data points located at a subset of distances in the near range of distances 112 (e.g., data points within one (1) foot of the image capturing device 104, for which one or more 3D-based analysis are impractical (e.g., depending on the capabilities of the three-dimensional sensor 204).

In the illustrated example of FIG. 3, the two-dimensional data analyzer 302 includes a body recognizer 322 to implement one or more 2D-based recognition analyses on two-dimensional data captured by, for example, the two-dimensional sensor 206 of FIG. 2A. Like the example body recognizer 308 of the three-dimensional data analyzer 300 of FIG. 3, the example body recognizer 322 of the two-dimensional data analyzer 302 attempts to recognize objects present in the environment 100 as people. For example, the body recognizer 322 of FIG. 3 utilizes a plurality of comparison techniques and/or algorithms to detect shape(s) corresponding to body part(s) such as, for example, an arm, a leg, a hand, a head, etc. As described above, the example body recognizer 308 of the three-dimensional data analyzer 300 of FIG. 3 is more accurate and efficient than the example body recognizer 322 of the two-dimensional data analyzer 302 of FIG. 3 when the body recognizer 308 of the three-dimensional data analyzer 300 is analyzing data points having a depth value less than a threshold distance. However, the example body recognizer 322 of the two-dimensional data analyzer 302 is more accurate than the body recognizer 308 of the three-dimensional data analyzer 300 when the body recognizer 308 of the three-dimensional data analyzer 300 is analyzing data points having a depth value greater than the threshold distance. Accordingly, the example people analyzer 208 of FIG. 3 utilizes the more accurate of the two body recognizers 308 and 322 depending on, for example, a depth value of an object to be analyzed.

When the example body recognizer 322 of FIG. 3 detects a body of a person in a particular frame of two-dimensional data, an indication of the recognition is conveyed to the example body counter 316 and/or the example frame database 318. In the illustrated example of FIG. 3, the example body counter 316 combines the body detections provided by the body recognizer 308 of the three-dimensional data analyzer 300 and the body detections provided by the body recognizer 322 of the two-dimensional data analyzer 302 corresponding to a common frame or frames to generate body counts for the respective frames. In some examples, the body counter 316 also executes one or more filters and/or check functions to avoid counting the same person more than once. Further, the example body recognizer 322 calculates and/or stores a location of the detected person in, for example, the frame database 318 in connection with a timestamp. In some examples, the location of the detected sent by the example body recognizer 322 is an x-y coordinate similar to the example coordinate 402 of FIG. 4.

In addition to or in lieu of the example body recognizer 322, the example two-dimensional data analyzer 302 of FIG. 3 includes a face recognizer 324 to obtain an identity of a person by analyzing two-dimensional data captured by, for example, the two-dimensional sensor 206. The example face recognizer 324 of FIG. 3 utilizes any suitable technique(s) and/or algorithm(s) to perform one or more identity recognition analyses. The example two-dimensional data analyzer 302 of FIG. 3 can implement additional or alternative recognition analys(es) that are based on two-dimensional data.

In some examples, the 2D-based recognition analys(es) performed by the example two-dimensional data analyzer 302 are initiated for each frame of data. However, in the illustrated example of FIG. 3, the two-dimensional data analyzer 302 includes an analysis trigger 326 to determine whether one or more of the 2D-based recognition analyses (e.g., the analysis performed by the body recognizer 322 and/or the analysis performed by the face recognizer 324) are to be performed on a certain frame of data and/or what type of 2D-based recognition analysis is to be performed. In particular, the example analysis trigger 326 of FIG. 3 triggers 2D-based recognition analyses in different circumstances and/or in response to different events. For example, the analysis trigger 326 of FIG. 3 triggers a 2D-based recognition analysis in response to arrival of a scheduled time (e.g., elapsing of a predefined time interval, occurrences of an absolute time, such as five minutes after an event, etc.). Additionally or alternatively, the example analysis trigger 326 of FIG. 3 may trigger a 2D-based recognition analysis in response to the crossover detector 320 determining that a person has travelled away from the three-dimensional sensor 204 into, for example, the mid-range 116 and/or the far range 120 of FIG. 1. Additionally or alternatively, the example analysis trigger 326 of FIG. 3 may trigger a 2D-based recognition analysis for a first frame in response to a 2D-based recognition of a second frame prior to the first frame resulting in detection of person. The example analysis trigger 326 of FIG. 3 may employ additional or alternative events, schedules, etc. for triggering one or more 2D-based recognition analysis.

Moreover, the example analysis trigger 326 of FIG. 3 initiates different types of 2D-based recognition analyses based on one or more factors and/or conditions. For example, the analysis trigger 326 of FIG. 3 sometimes triggers a full scan of the captured two-dimensional data (e.g., via the two-dimensional sensor 206). Additionally or alternatively, the example analysis trigger 326 of FIG. 3 triggers a scan of the captured two-dimensional data (e.g., via the two-dimensional sensor 206) corresponding to area(s) of the environment 100 having depth values greater than a threshold distance. Such area(s) of the environment 100 correspond to, for example, the far range 120 and/or the mid-range 116. Additionally or alternatively, the example analysis trigger 326 of FIG. 3 triggers a focused analysis that targets a subset of the captured two-dimensional data corresponding to a previously detected person.

The type of 2D-based recognition analysis triggered by the example analysis trigger 326 depends on, for example, which type of event or circumstance triggered the 2D-based recognition. For example, when the 2D-based recognition analysis is triggered in response to expiration of a first period of time or interval of a schedule elapsing, the example analysis trigger 326 of FIG. 3 selects a full scan of the two-dimensional data (e.g., via the face recognizer 324, via the body recognizer 322, etc.) that analyzes the entire environment 100 captured by the two-dimensional sensor 206. Additionally, when the 2D-based recognition is triggered in response to an expiration of a second period of time or interval of the schedule elapsing, the example analysis trigger 326 of FIG. 3 selects a scan of areas of the environment 100 having a depth value (e.g., according to the three-dimensional data points) greater than a threshold distance. In some examples, when the 2D-based recognition analysis is triggered in response to a detection of a person crossing over into the third detection area 126 and/or the second detection area 124, the example analysis trigger 326 of FIG. 3 selects a targeted scan (e.g., via the face recognizer 324, via the body recognizer 322, etc.) of the two-dimensional data focused on a particular area of the environment 100 corresponding to the detected person. In some examples, when the 2D-based recognition analysis is triggered for a first frame in response to a detection of a person in a second, prior frame via a 2D-based recognition analysis, the example analysis trigger 326 of FIG. 3 selects a targeted scan of the two-dimensional data focused on a particular area of the environment 100 corresponding to the previously detected person. The example analysis trigger 326 of FIG. 3 may employ and/or select additional or alternative types of 2D-based recognition analyses.

To implement the focused type of 2D-based recognition analysis that is limited to a particular area of the environment 100, the example two-dimensional data analyzer 302 of FIG. 3 includes an analysis limiter 328. The example analysis limiter 328 of FIG. 3 obtains location information associated with previously detected people to focus the 2D-based recognition analysis executed by the two-dimensional data analyzer 302 to certain area(s) of the environment 100. For example, the analysis limiter 328 of FIG. 3 obtains a coordinate provided by the example crossover detector 320 that corresponds to a person crossing over into the second detection area 124 and/or the third detection area 126 of FIG. 1A In some instances, the coordinate used by the example analysis limiter 328 corresponds to the example coordinate 402 of FIG. 4. As described above, a person recognized while located in the first detection area 122 (e.g., by the example body recognizer 308 of the three-dimensional data analyzer 300) may be determined to have travelled outside the first detection area 122 (e.g., into the mid-range set of distances 116 and/or the far range set of distances 120) and, thus, a 2D-based recognition analysis is selected by the people analyzer 208 to analyze such data (e.g., because the 2D-based recognition analysis is more accurate in detecting the person in subsequent frames than 3D-based recognition analysis for object located at certain depths of the environment). In such instances, the example analysis limiter 328 focuses the 2D-based recognition analysis in a certain area (e.g., the area where the person is expected to be) to avoid having to execute the 2D-based recognition analysis on the entire environment 100, which is computationally expensive. Alternatively, when the triggered 2D-based recognition analysis corresponds to a person detected via a previous execution of the 2D-based face recognizer 324 in a prior frame, the location obtained by the example analysis limiter 328 of FIG. 3 is a coordinate generated by the example body recognizer 322. That is, when the example face recognizer 324 of FIG. 3 (and/or body recognizer 322 of FIG. 3) detects a person in a first frame, the face recognizer 324 records the location of the person (e.g., an x-y coordinate such as the example coordinate 402 of FIG. 4). In such instances, the example analysis trigger 326 may trigger the face recognizer 324 to execute a 2D-based recognition analysis for a second, subsequent frame. If so, the example analysis limiter 328 of FIG. 3 uses the location recorded in connection with the first frame to focus the 2D-based recognition analysis on a corresponding part of the second frame. The example analysis limiter 328 of FIG. 3 focuses recognition analyses by, for example, defining boundaries around the obtained location (e.g., coordinate) and using the boundaries to limit the 2D-based recognition analysis within the boundaries. Put another way, the example analysis limiter 328 of FIG. 3 selects a portion or subset of the two-dimensional data captured by the two-dimensional sensor 206 for the 2D-based recognition analysis performed by, for example, the face recognizer 324.

The example analysis limiter 328 generates different types of boundaries that form different shapes around a focal point (e.g., the obtained coordinate in which analysis is to be performed). The shape created by the boundaries of the example analysis limiter 328 of FIG. 3 depends on, for example, which body part was detected by the body recognizer 322 in the previous frame. For example, when the body recognizer 322 has determined that an object in the environment 100 is likely a human head (and, thus, the focal coordinate is the center of the detected head), the example analysis limiter 328 of FIG. 3 defines boundaries that form a rectangle surrounding the obtained location point. Alternatively, when the body recognizer 322 has determined that an object in the environment 100 is likely a torso (and, thus, the focal coordinate is the center of the torso), the example analysis limiter 328 of FIG. 3 defines boundaries that form an oval surrounding the focal location point. The example analysis limiter 328 of FIG. 3 may use additional or alternative types of boundaries and/or shapes to focus the 2D-based recognition analysis performed by the example two-dimensional data analyzer 302 of FIG. 3 on specific area(s).

While the example people analyzer 208 of FIGS. 2 and/or 3 is described in the context of an audience measurement device system and the generation of exposure data for media, the example methods, articles of manufacture, and apparatus disclosed herein can be applied to additional or alternative environments, contexts, systems, measurements, applications, programs, problems, etc. That is, the example methods, articles of manufacture, and apparatus disclosed herein can be used in any application wherein detecting to determine how many people are located in a space or location would be beneficial (e.g., in security applications).

While example manners of implementing the people analyzer 208 of FIG. 2 have been illustrated in FIG. 3, one or more of the elements, processes and/or devices illustrated in FIG. 3 may be combined, divided, re-arranged, omitted, eliminated and/or implemented in any other way. Further, the example three-dimensional analyzer 300, the example two-dimensional analyzer 302, the example body tracker 304, the example depth filter 306, the example body recognizer 308, the example skeletal frame generator 310, the example face recognizer 312, the example gesture recognizer 314, the example body counter 316, the example crossover detector 320, the example body recognizer 322, the example face recognizer 324, the example analysis trigger 326, the example analysis limiter 328, and/or, more generally, the example people analyzer 208 of FIG. 3 may be implemented by hardware, software, firmware and/or any combination of hardware, software and/or firmware. Thus, for example, any of the example three-dimensional analyzer 300, the example two-dimensional analyzer 302, the example body tracker 304, the example depth filter 306, the example body recognizer 308, the example skeletal frame generator 310, the example face recognizer 312, the example gesture recognizer 314, the example body counter 316, the example crossover detector 320, the example body recognizer 322, the example face recognizer 324, the example analysis trigger 326, the example analysis limiter 328, and/or, more generally, the example people analyzer 208 of FIG. 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the system or apparatus claims of this patent are read to cover a purely software and/or firmware implementation, at least one of the example three-dimensional analyzer 300, the example two-dimensional analyzer 302, the example body tracker 304, the example depth filter 306, the example body recognizer 308, the example skeletal frame generator 310, the example face recognizer 312, the example gesture recognizer 314, the example body counter 316, the example crossover detector 320, the example body recognizer 322, the example face recognizer 324, the example analysis trigger 326, the example analysis limiter 328, and/or, more generally, the example people analyzer 208 of FIG. 3 are hereby expressly defined to include a tangible computer readable storage medium such as a storage device or storage disc storing the software and/or firmware. Further still, the example people analyzer 208 may include one or more elements, processes and/or devices in addition to, or instead of, those illustrated in FIG. 3, and/or may include more than one of any or all of the illustrated elements, processes and devices.

Figure 5:
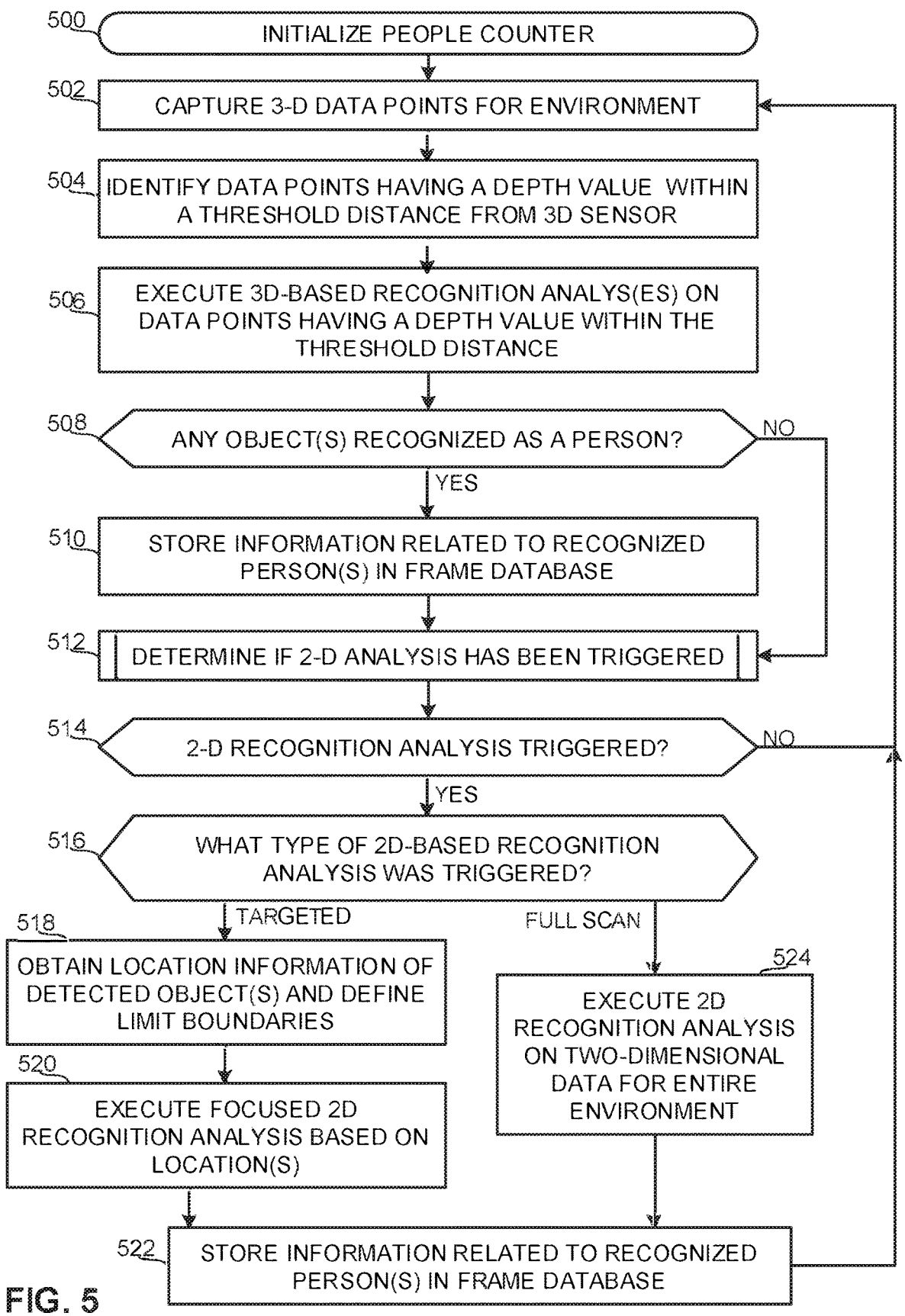
FIGS. 5 and 6 are flowcharts representative of example machine readable instructions that may be executed to implement the example audience measurement device of FIGS. 1, 2 and/or 3.
Figure 6:
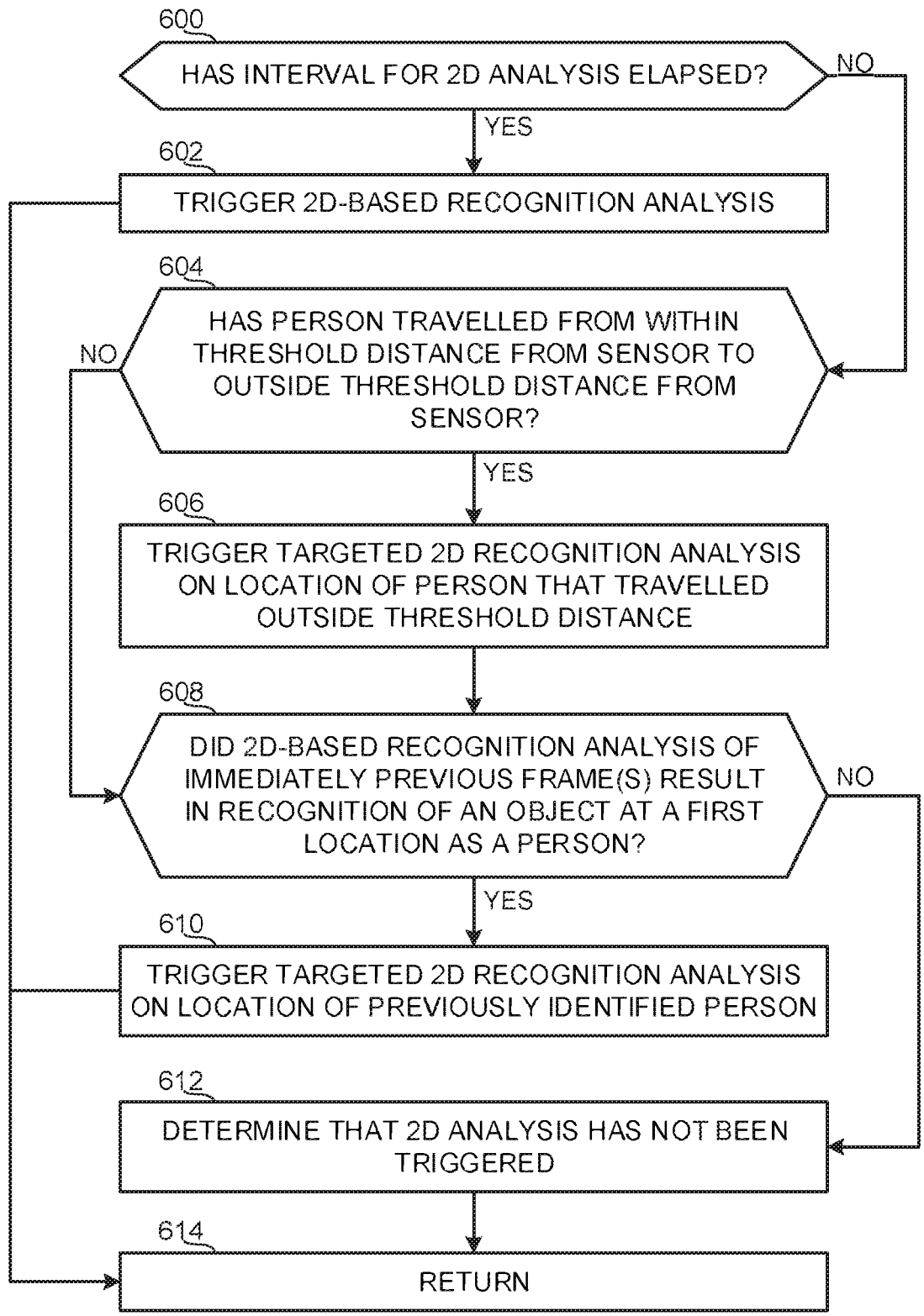

FIGS. 5 and 6 are flowcharts representative of example machine readable instructions for implementing the example people analyzer 208 of FIGS. 2 and/or 3. In the example flowcharts of FIGS. 5 and 6, the machine readable instructions comprise program(s) for execution by a processor such as the processor 712 shown in the example processing platform 700 discussed below in connection with FIG. 7. The program(s) may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program(s) is described with reference to the flowcharts illustrated in FIGS. 5 and 6, many other methods of implementing the example people analyzer 208 may alternatively be used. For example, the order of execution of the blocks may be changed, and/or some of the blocks described may be changed, eliminated, or combined.

As mentioned above, the example processes of FIGS. 5 and 6 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 5 and 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/ or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 5 begins with an initiation of the example people analyzer 208 of FIG. 3 (block 500). The initiation of the people analyzer 208 coincides with, for example, activation of the information presentation device 102 and/or the video game system 108 of FIG. 1. To begin analyzing the environment 100 of FIG. 1, the three-dimensional sensor 204 of FIG. 2A captures three-dimensional data representative of the environment 100 and the objects present in the environment 100 at a first time (block 502). The example three-dimensional sensor captures a plurality of three-dimensional data points having a horizontal component, a vertical component, and a depth value component. The example depth filter 306 of FIG. 3 analyzes the data points to determine whether the respective depth values are within one or more threshold distances from the three-dimensional sensor 204 (block 504). The threshold distance(s) correspond to, for example, the first and second threshold distances 114 and 118 of FIG. 1. For those of the data points having a depth value, for example, between the threshold distances 114 and 118, the example three-dimensional data analyzer 300 performs one or more 3D-based recognition analyses to detect people present in the environment 100 (block 506). For example, the example body recognizer 308 of FIG. 3 executes a plurality of 3D-based recognition analyses to detect different body parts of a person, such as a head, an arm, a leg, etc. Additionally or alternatively, the example skeletal framework generator 310 of FIG. 3 generates a mapping of a detected body. Additionally or alternatively, the example face recognizer 312 of FIG. 3 identifies any known people present in the environment 100. Additionally or alternatively, the example gesture recognizer 314 of FIG. 3 determines whether the detected people are making one or more known gestures (e.g., in connection with the video game system 108 and/or as feedback to the meter 106 in response to media currently being presented by the information presentation device 102). As described above, the data points identified within the first threshold distance 114 from the sensor 104 may additionally or alternatively be subject to 2D-based recognition analysis.

If the example body recognizer 308 of FIG. 3 determines that one or more objects in the environment 100 correspond to people (block 508), the related information is stored in the example body tracker 304 of FIG. 3 (block 510). For example, the body recognizer 308 of FIG. 3 conveys an indication of a detected person to the example body counter 316. The example body counter 316 maintains records of body counts for different frames and/or periods of time such that people counts can be generated (e.g., for purposes of generating ratings information for media detected in the environment 100). In the illustrated example, the body recognizer 308 also records the location information (e.g., an x-y coordinate) of any detected people and/or conveys the location information to the example crossover detector 320.

The example analysis trigger 326 of FIG. 3 determines whether a 2D-based recognition analysis is to be triggered (block 512). FIG. 6 illustrates an example implementation of block 512 of FIG. 5. In the example of FIG. 6, the analysis trigger 326 determines whether a predefined interval or period of time has elapsed according to, for example, a user configurable schedule (block 600). If the predefined interval has elapsed in the example of FIG. 6 (block 600), the example analysis trigger 326 initiates the face recognizer 324 to perform a full scan of the environment 100 or a scan of portions of the environment 100 having a depth value (e.g., according to the corresponding three-dimensional data points) greater than the threshold distance (e.g., the second threshold distance 118 of FIG. 1) (block 602).

Alternatively, when the predefined interval has not elapsed (block 600), the example analysis trigger 326 determines whether a person has travelled from within the threshold distance to outside the threshold distance (block 604). In the illustrated example, the analysis trigger 326 references the crossover detector 320 of FIG. 3, which may convey an indication of such a detection to the analysis trigger 326, to determine whether such a transition from one of the ranges 112, 116 and 120 of FIG. 1 to another one of the ranges in a direction away from the three-dimensional sensor 204. If a person is detected travelling outside the threshold distance, the example analysis trigger 326 of FIG. 3 triggers a targeted 2D-based recognition analysis on a location of the environment 100 corresponding to the detected person (block 606). For example, the analysis trigger 326 may cause the face recognizer 324 of FIG. 3 to inspect a rectangle defined around a coordinate of the detected person to obtain an identity of the person.

In the illustrated example of FIG. 6, the analysis trigger 326 also determines whether one or more previous 2D-based recognition analysis (e.g., performed by the example body recognizer 322) of one or more immediately previous frames (e.g., one or more frames directly prior to a current frame in a chronological sequence) resulted in a detection of a person in the environment 100 (block 608). The number of previous frames that a person detection can trigger a subsequent 2D-based recognition analysis is configurable and can be any suitable number of frames (e.g., five frames, ten frames, etc.) and/or a corresponding period of time (e.g., ten seconds, fifteen seconds, etc.). As described above, such detections are recorded in the example body tracker 304 of FIG. 3 along with related information, such as a location of the detected person(s) in the environment 100. In the example of FIG. 6, when a person was detected in a previous frame (block 608), the example analysis trigger 326 of FIG. 3 triggers a targeted 2D-based recognition analysis for the location corresponding to the previously detected person (block 610).

Alternatively, the example of FIG. 6 may lead to a determination that a 2D-based recognition analysis has not been triggered (block 612). Control then returns to FIG. 5. If a 2D-based recognition analysis has not been triggered (block 514), control returns to block 502. Otherwise, if a 2D-based recognition analysis has been triggered (block 514), the example analysis trigger 326 determines what type of 2D-based recognition analysis has been triggered (block 516). When the triggered 2D-based recognition is a targeted analysis (block 516), the example analysis limiter 328 of FIG. 3 obtains the corresponding location in the environment 100 around which the analysis is to be focused (block 518). Further, the example analysis limiter 328 of FIG. 3 defines boundaries to limit the analysis to a certain portion or subset of the two-dimensional data captured by the two-dimensional sensor 206 (block 518). The focused 2D-based recognition analysis is then executed by, for example, the body recognizer 322 and/or the face recognizer 324 within the defined limit boundaries (block 520). Results of the recognition analysis are stored in the example body tracker 304 of FIG. 3 (block 522).

When the type of 2D-based recognition analysis that was triggered is a full scan of the environment 100 (block 516), the example two-dimensional data analyzer 302 executes the corresponding one or more 2D-based analyses (e.g., via the face recognizer 324 and/or the body recognizer 322) (block 524). The results of the analys(es) are stored in the example body tracker 304 of FIG. 3 (block 522). Control then returns to block 502.

Figure 7:
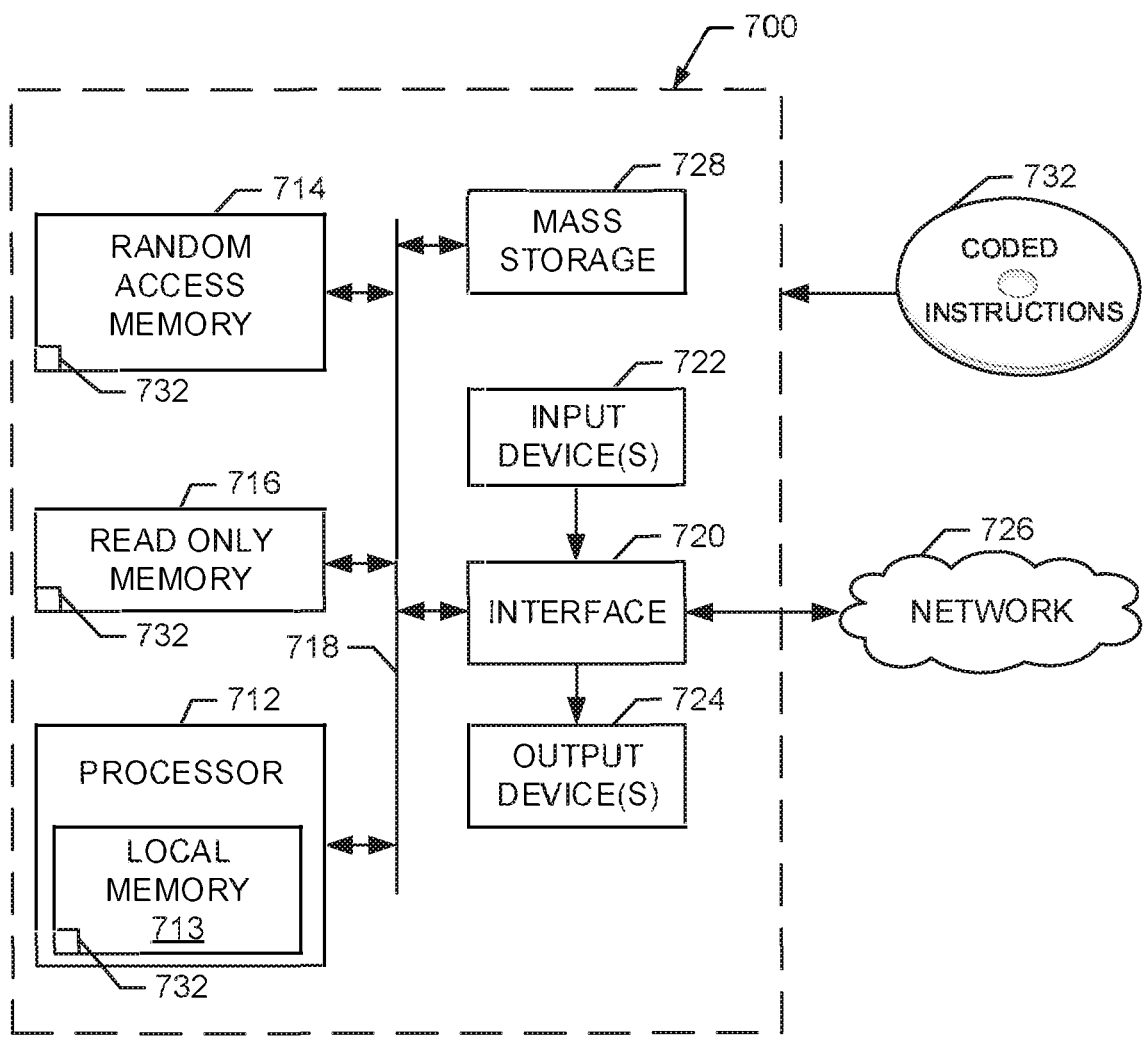
FIG. 7 is a block diagram of an example processing system capable of executing the example machine readable instructions of FIGS. 5 and/or 6 to implement the example audience measurement device of FIGS. 1, 2 and/or 3.

FIG. 7 is a block diagram of an example processor platform 700 capable of executing the instructions of FIGS. 5 and 6 to implement the example audience measurement device of FIGS. 1, 2 and/or 3. The processor platform 700 can be, for example, a personal computer, an Internet appliance, a DVD player, a CD player, a digital video recorder, a Blu-ray player, a gaming console, a personal video recorder, a set top box, or any other type of computing device.

The processor platform 700 of the instant example includes a processor 712. For example, the processor 712 can be implemented by one or more microprocessors or controllers from any desired family or manufacturer.

The processor 712 includes a local memory 713 (e.g., a cache) and is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714 and the non-volatile memory 716 is controlled by a memory controller.

The example processor platform 700 of FIG. 7 also includes an interface circuit 720. The interface circuit 720 may be implemented by any type of interface standard, such as an Ethernet interface, a universal serial bus (USB), and/or a PCI express interface.

In the example of FIG. 7, one or more input devices 722 are connected to the interface circuit 720. The input device(s) 722 permit a user to enter data and commands into the processor 712. The input device(s) can be implemented by, for example, a keyboard, a mouse, a touchscreen, a track-pad, a trackball, isopoint and/or a voice recognition system.

In the example of FIG. 7, one or more output devices 724 are also connected to the interface circuit 720. The output devices 724 can be implemented, for example, by display devices (e.g., a liquid crystal display, a cathode ray tube display (CRT), a printer and/or speakers). The interface circuit 720, thus, typically includes a graphics driver card.

The interface circuit 720 also includes a communication device such as a modem or network interface card to facilitate exchange of data with external computers via a network 726 (e.g., an Ethernet connection, a digital subscriber line (DSL), a telephone line, coaxial cable, a cellular telephone system, etc.).

The processor platform 700 also includes one or more mass storage devices 728 for storing software and data. Examples of such mass storage devices 728 include floppy disk drives, hard drive disks, compact disk drives and digital versatile disk (DVD) drives. The mass storage device 728 may implement the frame database 318 of FIG. 3.

Coded instructions 732 of FIGS. 5 and/or 6 may be stored in the mass storage device 728, in the volatile memory 714, in the non-volatile memory 716, and/or on a removable storage medium such as a CD or DVD.

In some example implementations, the example meter 106 of FIGS. 1, 2 and/or 3 is implemented in connection with an XBOX® gaming system In some examples, the one or more sensors associated with the example image capturing device 104 of FIGS. 1 and/or 2A are implemented with KINECT® sensors (e.g., to capture images of an environment to count people). In some examples, some or all of the machine readable instructions of FIGS. 5 and/or 6 can be downloaded (e.g., via the Internet) to and stored on an XBOX® gaming console that implements the example meter 106 of FIGS. 1, 2 and/or 3. In some examples, the machine readable instructions of FIGS. 5 and/or 6 are downloaded prior to the retail point of sale and only activated upon receiving consent from a purchaser.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method for audience measurement comprising:
   obtaining media identifying information corresponding to media content displayed on a media presentation device in a media exposure environment of a household having multiple audience members;
   capturing, using an image capturing device in the media exposure environment, a plurality of three-dimensional data points and a plurality of two-dimensional data points;
   determining that a portion of the plurality of the three-dimensional data points comprises depth values within a threshold distance from the image capturing device, wherein the threshold distance from the image capturing device corresponds to a portion of the media exposure environment of the household having the multiple audience members;
   executing a three-dimensional recognition analysis on the portion of the three-dimensional data points;
   triggering, in response to the three-dimensional recognition analysis, execution of a two-dimensional recognition analysis of at least a portion of the plurality of the two-dimensional data points;
   determining, using the three-dimensional recognition analysis and the two-dimensional recognition analysis, which of the audience members are present in the media exposure environment; and
   transmitting, to a data collections facility of an audience measurement entity, for each of one or more of the audience members that are present in the media exposure environment, a respective audience member identifier and the media identifying information to generate ratings for the media content.

2. The method of claim 1, wherein the portion of the media exposure environment is a first portion of the media exposure environment, and wherein triggering the execution of the two-dimensional recognition analysis occurs in response to the three-dimensional recognition analysis determining at least one audience member is beyond the threshold distance in a second portion of the media exposure environment.

3. The method of claim 1, wherein the portion of the media exposure environment is a first portion; and wherein the two-dimensional recognition analysis selects a targeted scan of a portion of the plurality of two-dimensional data points corresponding to a second portion of the media exposure environment extending beyond the threshold distance.

4. The method of claim 1, wherein the two-dimensional recognition analysis selects a full scan of the media exposure environment from the plurality of two-dimensional data points.

5. The method of claim 1, further comprising:
   identifying an output of the two-dimensional recognition analysis to determine which type of two-dimensional recognition analysis was triggered; and
   storing, for each of the one or more of the audience members that are present in the media exposure environment, the respective audience member identifier.

6. The method of claim 5, wherein a first type of two-dimensional recognition analysis is based on capturing the plurality of the two-dimensional data points for the media exposure environment, and wherein a second type of the two-dimensional recognition analysis is based on capturing the plurality of two-dimensional data points for a subset of the media exposure environment.

7. The method of claim 1, wherein the image capturing device comprises a two-dimensional sensor and a three-dimensional sensor.

8. A computing system, comprising:
   a processor; and
   a non-transitory computer-readable storage medium, having stored thereon program instructions that, upon execution by the processor, cause performance of a set of operations comprising:
   capturing, using an image capturing device in a media exposure environment, a plurality of three-dimensional data points and a plurality of two-dimensional data points;
   determining that a portion of the plurality of the three-dimensional data points comprises depth values within a threshold distance from the image capturing device, wherein the threshold distance from the image capturing device corresponds to a portion of the media exposure environment of a household having multiple audience members;
   executing a three-dimensional recognition analysis on the portion of the three-dimensional data points;
   triggering, in response to the three-dimensional recognition analysis, execution of a two-dimensional recognition analysis of at least a portion of the plurality of the two-dimensional data points;
   determining, using the three-dimensional recognition analysis and the two-dimensional recognition analysis, which of the audience members are present in the media exposure environment; and
   storing, for each of one or more of the audience members that are present in the media exposure environment, a respective audience member identifier.

9. The computing system of claim 8, wherein the portion of the media exposure environment is a first portion of the media exposure environment, and wherein triggering the execution of the two-dimensional recognition analysis occurs in response to a time interval elapsing and the three-dimensional recognition analysis determining that at least one audience member is beyond the threshold distance in a second portion of the media exposure environment.

10. The computing system of claim 8, wherein the portion of the media exposure environment is a first portion; and wherein the two-dimensional recognition analysis selects a targeted scan of a portion of the plurality of two-dimensional data points corresponding to a second portion of the media exposure environment extending beyond the threshold distance.

11. The computing system of claim 8, wherein the two-dimensional recognition analysis selects a full scan of the media exposure environment from the plurality of two-dimensional data points.

12. The computing system of claim 8, the set of operations further comprising:
identifying an output of the two-dimensional recognition analysis to determine which type of two-dimensional recognition analysis was triggered.

13. The computing system of claim 12, wherein a first type of two-dimensional recognition analysis is based on capturing the plurality of the two-dimensional data points for the media exposure environment, and wherein a second type of the two-dimensional recognition analysis is based on capturing the plurality of two-dimensional data points for a subset of the media exposure environment.

14. The computing system of claim 8, the set of operations further comprising:
obtaining media identifying information corresponding to media content displayed on a media presentation device in the media exposure environment of the household having the multiple audience members; and
transmitting, to a data collections facility of an audience measurement entity, for each of the one or more of the audience members that are present in the media exposure environment, the respective audience member identifier and the media identifying information to generate ratings for the media content.

15. A non-transitory computer-readable storage medium, having stored thereon program instructions that, upon execution by a processor, cause performance of a set of operations comprising:
obtaining media identifying information corresponding to media content displayed on a media presentation device in a media exposure environment of a household having multiple audience members;
capturing, using an image capturing device in the media exposure environment, a plurality of three-dimensional data points and a plurality of two-dimensional data points;
determining that a portion of the plurality of the three-dimensional data points comprises depth values within a threshold distance from the image capturing device, wherein the threshold distance from the image capturing device corresponds to a portion of the media exposure environment of the household having the multiple audience members;
executing a three-dimensional recognition analysis on the portion of the three-dimensional data points;
triggering, in response to the three-dimensional recognition analysis, execution of a two-dimensional recognition analysis of at least a portion of the plurality of the two-dimensional data points;
determining, using the three-dimensional recognition analysis and the two-dimensional recognition analysis, which of the audience members are present in the media exposure environment; and
transmitting, to a data collections facility of an audience measurement entity, for each of one or more of the audience members that are present in the media exposure environment, a respective audience member identifier and the media identifying information to generate ratings for the media content.

16. The non-transitory computer-readable storage medium of claim 15, wherein a meter obtains the media identifying information; and wherein the image capturing device comprises a three-dimensional sensor and a two-dimensional sensor.

17. The non-transitory computer-readable storage medium of claim 15, wherein the portion of the media exposure environment is a first portion; and wherein the two-dimensional recognition analysis selects a targeted scan of a portion of the plurality of two-dimensional data points corresponding to a second portion of the media exposure environment extending beyond the threshold distance.

18. The non-transitory computer-readable storage medium of claim 15, wherein the two-dimensional recognition analysis selects a full scan of the media exposure environment from the plurality of two-dimensional data points.

19. The non-transitory computer-readable storage medium of claim 15, the set of operations further comprising:
identifying an output of the two-dimensional recognition analysis to determine which type of two-dimensional recognition analysis was triggered.

20. The non-transitory computer-readable storage medium of claim 19, wherein a first type of two-dimensional recognition analysis is based on capturing the plurality of the two-dimensional data points for the media exposure environment, and wherein a second type of the two-dimensional recognition analysis is based on capturing the plurality of two-dimensional data points for the portion of the media exposure environment.

* * * * *